United States Patent
Mishra et al.

(10) Patent No.: US 12,375,927 B2
(45) Date of Patent: Jul. 29, 2025

(54) PROACTIVE MITIGATION OF WI-FI 6E ROGUE CLIENTS CONNECTING TO WI-FI 6E ACCESS POINTS IN WIRELESS NETWORKS

(71) Applicant: Fortinet, Inc., Sunnyvale, CA (US)

(72) Inventors: Ruchir Mishra, Sunnyvale, CA (US); Shrikant Gambheer Patil, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 96 days.

(21) Appl. No.: 18/217,119

(22) Filed: Jun. 30, 2023

(65) Prior Publication Data

US 2024/0214815 A1   Jun. 27, 2024

Related U.S. Application Data (63) Continuation-in-part of application No. 18/092,309, filed on Dec. 31, 2022, which is a continuation-in-part of application No. 18/088,980, filed on Dec. 27, 2022.

(51) Int. Cl.
| | |
|---|---|
| *H04W 12/122* | (2021.01) |
| *H04W 12/037* | (2021.01) |
| *H04W 48/16* | (2009.01) |
| *H04W 84/12* | (2009.01) |

(52) U.S. Cl.
CPC ....... *H04W 12/122* (2021.01); *H04W 12/037* (2021.01); *H04W 48/16* (2013.01); *H04W 84/12* (2013.01)

(58) Field of Classification Search
CPC .. H04W 12/122; H04W 12/037; H04W 48/16
See application file for complete search history.

(56) References Cited

U.S. PATENT DOCUMENTS

| | | | |
|---|---|---|---|
| 2015/0257026 A1 | 9/2015 | Muttik | |
| 2022/0030665 A1* | 1/2022 | Nakanishi | ............... H04W 8/26 |

* cited by examiner

*Primary Examiner* — Lan Dai T Truong
(74) *Attorney, Agent, or Firm* — Law Office of Dorian Cartwright; Dorian Cartwright (57) ABSTRACT

A list is received from the Wi-Fi controller of rogue Wi-Fi 6E access points identified by BSSID within a vicinity of the Wi-Fi 6E access points based on RSSI measurements sent to the Wi-Fi controller. A rogue Wi-Fi 6E access point of the Wi-Fi controller list from the periodic beacon scanning. In response, prior to connection of any station to the rogue Wi-Fi 6E access point, broadcasts spoofed beacons on behalf of the rogue Wi-Fi 6E access point, using SSID and BSSID over the current operating channel of the rogue Wi-Fi 6E access point. The beacons are spoofed by modifying the MFP field value to indicate no encryption capability and also to indicate no encryption requirement for management frames.

15 Claims, 6 Drawing Sheets

```
> Tag: RSN Information
    Tag Number: RSN Information (48)
    Tag length: 26
    RSN Version: 1
  > Group Cipher Suite: 00:0f:ac (Ieee 802.11) AES (CCM)
      Group Cipher Suite OUI: 00:0f:ac (Ieee 802.11)
      Group Cipher Suite type: AES (CCM) (4)
    Pairwise Cipher Suite Count: 1
  > Pairwise Cipher Suite List 00:0f:ac (Ieee 802.11) AES (CCM)
    > Pairwise Cipher Suite: 00:0f:ac (Ieee 802.11) AES (CCM)
        Pairwise Cipher Suite OUI: 00:0f:ac (Ieee 802.11)
        Pairwise Cipher Suite type: AES (CCM) (4)
    Auth Key Management (AKM) Suite Count: 1
  > Auth Key Management (AKM) List 00:0f:ac (Ieee 802.11) SAE (SHA256)
    > Auth Key Management (AKM) Suite: 00:0f:ac (Ieee 802.11) SAE (SHA256)
  > RSN Capabilities: 0x00cd
      .... .... .... ...1 = RSN Pre-Auth capabilities: Transmitter supports pre-authentication
      .... .... .... ..0. = RSN No Pairwise capabilities: Transmitter can support WEP default key 0 simultaneously with Pairwise key
      .... .... .... 00.. = RSN PTKSA Replay Counter capabilities: 1 replay counter per PTKSA/GTKSA/STAKeySA (0x0)
      .... .... ..00 .... = RSN GTKSA Replay Counter capabilities: 1 replay counter per PTKSA/GTKSA/STAKeySA (0x0)
      .... .... .1.. .... = Management Frame Protection Required: True
      .... .... 1... .... = Management Frame Protection Capable: True
      .... ...0 .... .... = Joint Multi-band RSNA: False
      .... ..0. .... .... = PeerKey Enabled: False
      ...0 .... .... .... = Extended Key ID for Individually Addressed Frames: Not supported
    PMKID Count: 0
    PMKID List
```

PROACTIVE MITIGATION OF WI-FI 6E ROGUE CLIENTS CONNECTING TO WI-FI 6E ACCESS POINTS IN WIRELESS NETWORKS

CROSS-REFERENCE TO RELATED APPLICATIONS

The present invention is related as a continuation-in-part patent application under 35 USC 120 (a) to US application. Ser. No. 18/092,309, filed Dec. 31, 2022, by Ruchir Mishra et al., the contents of which are hereby incorporated in their entirety.

FIELD OF THE INVENTION

The invention relates generally to computer networks, and more specifically, to preventing connections from Wi-Fi 6E stations to rogue Wi-Fi 6E access points.

BACKGROUND

The basic line is that all data transmission in 6 GHz will be encrypted and open networks are not allowed. However, Wi-Fi 6E does not support PSK authentication because WPA2 does not support backward compatibility. Simultaneous Authentication of Equals replaces PSK in WPA3-Personal (SAE). Even with WPA3-Enterprise, 802.1X will be used. Additionally, management frame protection (MFP) will be necessary.

When WIPS sensors become active and transmit layer 2 de-authentication frames that spoof the MAC addresses of the rogue access points and rogue clients, rogue mitigation (also known as rogue confinement) is carried out wirelessly. A layer 2 denial-of-service assault is used as a countermeasure by WIPS solutions. However, MFP and WPA3 are mandatory on 6 GHz for Wi-Fi 6E station connectivity. Many of the standard layer 2 mitigation strategies will be worthless due to MFP.

In 6 GHZ, there are now 59 channels that need to be watched out for potential threats. The intervals between scans will be significantly longer.

When the Wi-Fi 6E client probes the 2.4 or/and 5 GHZ band, the out-of-band discovery procedure is applied. The 2.4 or/and 5 GHz radios in the APs will react to the probe with information on the 2.4 or/and 5 GHz channel availability and RNR for the 6 GHz radios co-located in the same AP.

With the advent of Wi-Fi 6E, the rise of Wi-Fi 6E rogue-AP's operating in 6 GHz frequency-bands will also rise. As mandated, MFP and WPA3 are necessary on 6 GHZ. In a scenario where a Wi-Fi 6E rogue-AP i.e. operating in 6 GHz frequency starts operating in the close range of authorized access points can cause various attacks like Dos (Denial of Service) or man-in-the-middle attacks.

A rogue Wi-Fi 6E client which gets connected via WPA3 security to this Wi-Fi 6E rogue-AP will also be using mandatory management frame protection (MFP), due to which the entire-connection including management-frames exchanged between WiFi-6E rogue access point and rogue Wi-Fi 6E client will be protected/encrypted.

This is simply going to outdate the existing rogue-AP detection and mitigation strategy of spoofing and sending broadcast/unicast de-authentication frames to disrupt connection between a rogue access point and rogue station.

What is needed is a robust technique for detecting encryption and preventing connections from Wi-Fi 6E stations to rogue Wi-Fi 6E access points, prior to encryption.

SUMMARY

To meet the above-described needs, methods, computer program products, and systems for preventing connections from Wi-Fi 6E stations to rogue Wi-Fi 6E access points, prior to encryption.

In one embodiment, a rogue Wi-Fi 6E scanning module to periodically scan for beacons from neighboring Wi-Fi 6E access points using a dedicated radio of a plurality of radios, and detect the neighboring Wi-Fi 6E access points beacons include management frame protection (MFP) fields indicating encryption capability and also indicating encryption requirement for management frames.

In another embodiment, a rogue Wi-Fi 6E identification module the channel reports scan results to a Wi-Fi controller including BSSID (Basic Service Set Identifier), SSID (Service Set Identifier), and an operating channel along with RSSI measurements, to determine whether Wi-Fi 6E access points is rogue, wherein a rogue Wi-Fi 6E access points is a third-party vendor having an OUI mismatch with an OUI of the vendor of Wi-Fi 6E access point from the BSSID. The rogue Wi-Fi 6E identification module receives a list from the Wi-Fi controller of rogue Wi-Fi 6E access points identified by BSSID within a vicinity of the Wi-Fi 6E access points based on RSSI measurements sent to the Wi-Fi controller. The rogue Wi-Fi 6E identification module detects a rogue Wi-Fi 6E access point of the Wi-Fi controller list from the periodic beacon scanning; and In still another embodiment, a rogue Wi-Fi 6E spoofing module, prior to connection of a specific station to the rogue Wi-Fi 6E access point, broadcasts spoofed beacons on behalf of the rogue Wi-Fi 6E access point, using SSID and BSSID over the operating channel, wherein the beacons are spoofed by modifying the MFP field value to indicate no encryption capability and also to indicate no encryption requirement for management frames.

Advantageously, computer networking is improved with more secure network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for preventing connections from Wi-Fi 6E stations to rogue Wi-Fi 6E access points, prior to establishment of an encrypted connection. One of ordinary skill in the art will recognize many alternative embodiments that are not explicitly listed based on the following disclosure.

Figure 2:
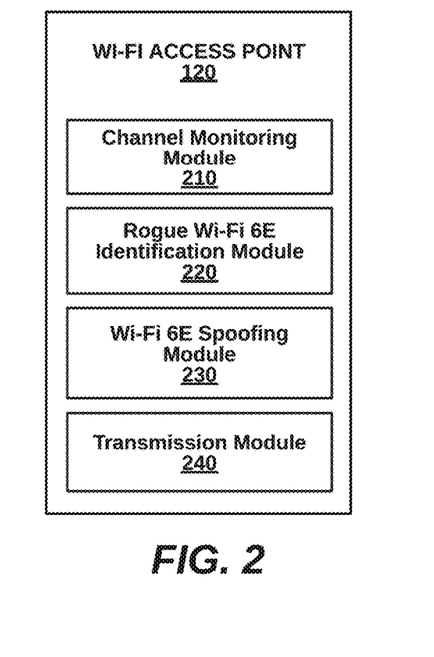
FIG. 2 is a more detailed block diagram illustrating a Wi-Fi 6E access point of the system of FIG. 1, according to one embodiment.
Figure 3:
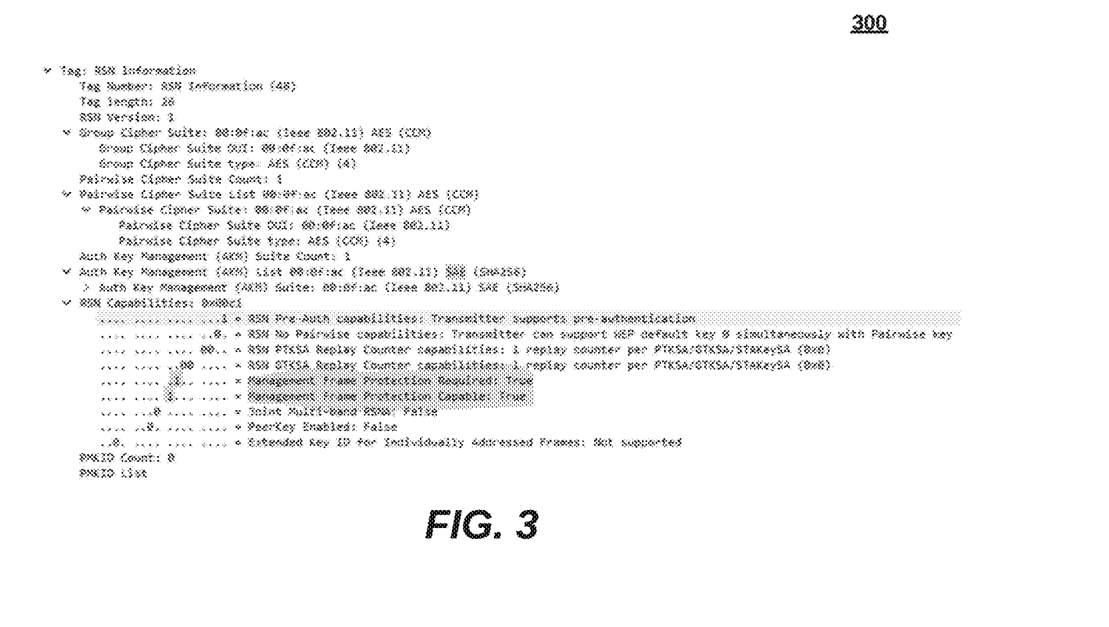
FIG. 3 is an example of a data structure for a beacon including an MFP field.

I. Network Systems for Preventing Rogue Connections Before Establishing Encrypted Connection (FIGS. 1-3)

Figure 1:
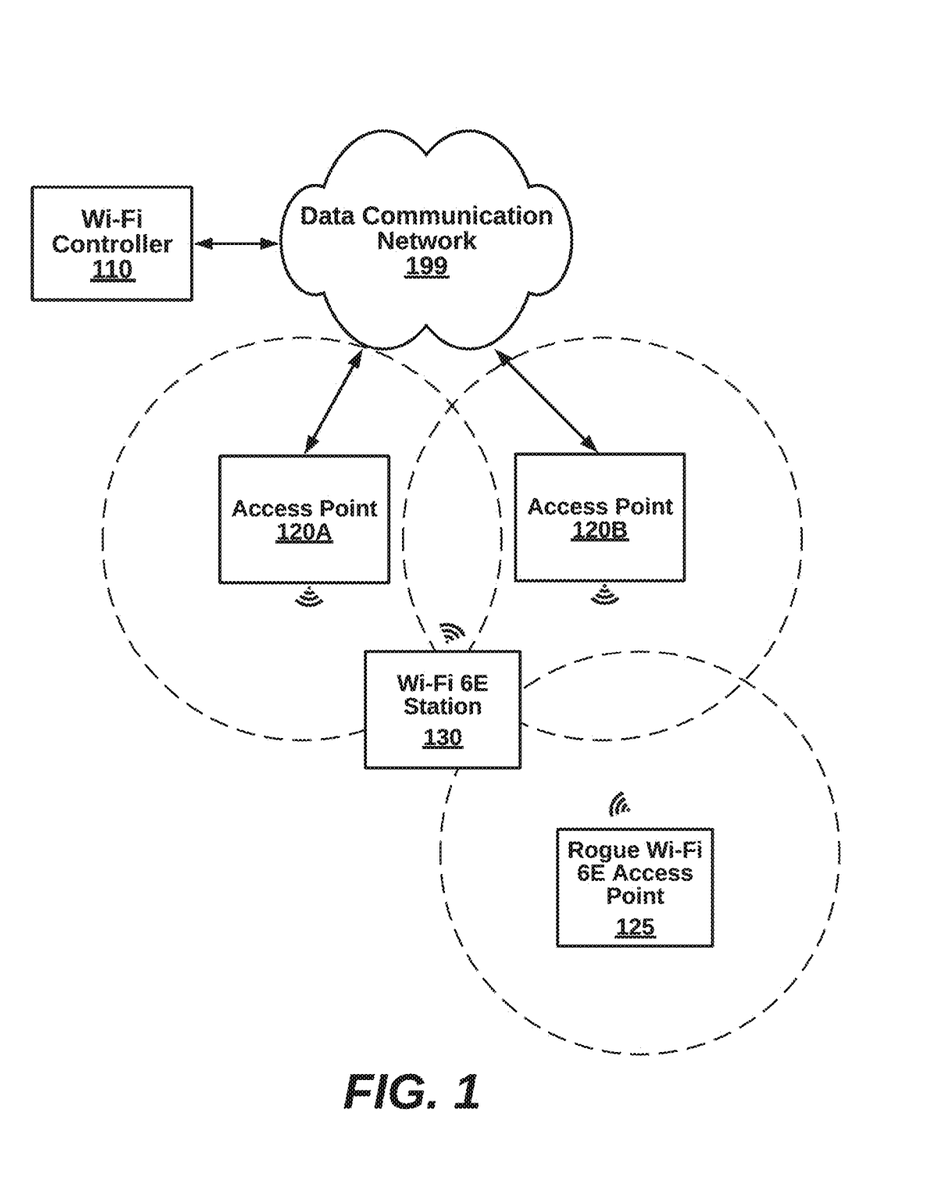
FIG. 1 is a high-level block diagram illustrating a network system for detecting encryption and preventing connections from Wi-Fi 6E stations to rogue Wi-Fi 6E access points, prior to encryption, according to one embodiment.

FIG. 1 is a high-level block diagram illustrating a network system 100 for preventing connections from Wi-Fi 6E stations to rogue Wi-Fi 6E access points, according to one embodiment. The network system 100 includes a Wi-Fi 6E access points 120A-B, rogue Wi-Fi 6E access point 125 and Wi-Fi 6E station 130. Other embodiments of the system 100 can include additional components that are not shown in FIG. 1, such as controllers, network gateways, routers, switches, additional access points (Wi-Fi 6E access points and others), and additional wired or wireless stations (Wi-Fi 6E stations and others). Many variations are possible. The components are implemented in hardware, software, or a combination of both, as shown in the example below of FIG. 7.

The Wi-Fi 6E access point 110 can be coupled to a data communication network 199 such as a private network connected to the Internet. The Wi-Fi 6E access point 110 can be connected to the data communication system both via hard wire (e.g., Ethernet) and via wireless networking, and serve as a bridge for access back and forth. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPv4 or IPV6 address spaces.

The Wi-Fi 6E access point 120A prevents connections from Wi-Fi 6E stations to rogue Wi-Fi 6E access points with spoofed management frame protection (MFP) fields in beacons. Generally, MPF indicates encryption ability and encryption requirement for management frames. Thus, the management frames like beacons are sniffed to determine: if MFP is enabled, operating channel of the Wi-Fi 6E rouge access point 125, operating channel bandwidth of Wi-Fi rogue access point 125, and SSID and BSSID of Wi-Fi 6E rogue access point 125. In one case, both Wi-Fi 6E access point 120A and Wi-Fi 6E access point 120B, cooperatively attack rogue devices spoofed frames. In one example, prior to connection, spoofed broadcast beacon frames with modified MFA frames attempt to prevent a connection. If a connection is eventually made, spoofed CSA frames attempt to break the connection of encrypted frames, as described in US application. Ser. No. 18/092,309. Once broken, the spoofed broadcast beacon frames with modified MFA frames with modified MFP field can again be utilized for stopping reconnections.

Rogue access points can be discovered in band or out of band. In band scanning uses 6 GHz while out of band scanning uses 2.4 GHz and 5 GHz beacons. An operating channel and bandwidth are determined. Both the operating channel and bandwidth can be manipulated to confuse rogue devices. The Wi-Fi 6E access point is explained in more detail below with respect to FIG. 2.

The Wi-Fi 6E station 130 is capable of Wi-Fi 6E operations when connecting to the wireless network. Beacons are received by the Wi-Fi 6E station 130 for nearby access points. However, the Wi-Fi 6E station 130 may be unaware that some beacons are broadcasted by rogue devices, so they unknowingly connect. A connection status can change because although approved devices are continuously preventing and breaking connections, malicious devices are also continuously attempting connections and reconnections to devices that have had the connection broken.

The Wi-Fi 6E station 130 can be a laptop, a smart telephone, a PC, a smart appliance, or any appropriate processor-driven device. For example, in an office environment, workers use office computing equipment and bring personal devices from home, and connect these devices for Internet service. Data traffic to and from the Wi-Fi 6E stations characterizes malicious behavior. A user can run a network application such as a browser which generates data traffic.

A Wi-Fi controller 110, in some embodiments, also participates in rogue access point mitigation. Access points can be centrally coordinated for optimal coverage area for attacking a particular rogue access point. Rogue devices can be tracked even as they move to different locations, and histories connected between different connection sessions. In general operations, the Wi-Fi controller 110 manages the access points 120A, B along with other access points on the data communication network 199. In doing so, network statistics collected can be leveraged for tracking rogue access points from different points of the network (e.g., different access points).

FIG. 2 is a more detailed block diagram illustrating the Wi-Fi 6E access point 120 (representative of access points 120A and 120B) of FIG. 1, according to an embodiment. The Wi-Fi 6E access point 120 includes a channel monitoring module 210, a rogue Wi-Fi 6E identification module 220, a rogue Wi-Fi 6E spoofing module 230, and a transmission module 240. Components can be implemented in software and/or hardware. Many other variations of components are possible.

The channel monitoring module 210 periodically scans for beacons from neighboring Wi-Fi 6E access points using a dedicated radio of a plurality of radios. Each access point has an RF range that is generally circular, and detection is possible where the RF ranges overlap. The beacons detected from neighboring Wi-Fi 6E access points include MFP fields indicating encryption capability and also indicating encryption requirement for management frames.

The rogue Wi-Fi 6E identification module 220 reports scan results to a Wi-Fi controller including BSSID, SSID, and an operating channel along with RSSI measurements, to determine whether Wi-Fi 6E access points is rogue. A rogue Wi-Fi 6E access points can be defined as a third-party vendor having an OUI mismatch with an OUI of the vendor of Wi-Fi 6E access point from the BSSID. In one embodiment, a reduced neighbor report (RNR) information element, can be used to convey details about a neighboring access points, as first described in 802.11v. The adjacent access point for Wi-Fi 6E is actually the 6 GHz radio housed in the same AP as the 5 GHz radio. The RNR information in either beacon or probe response frames delivered by the access point 2.4 and 5 GHz radios will educate Wi-Fi 6E clients about the 6 GHz radio that is available.

In turn, a list of rogue Wi-Fi 6E access points identified by BSSID within a vicinity of the Wi-Fi 6E access points based on RSSI measurements sent to the Wi-Fi controller is received. The channel monitoring module 210 can now look for known rogue Wi-Fi 6E access points.

The rogue Wi-Fi 6E spoofing module 230, prior to connection of a specific station to the rogue Wi-Fi 6E access point, broadcasts spoofed beacons to an RF range including the specific station on behalf of the rogue Wi-Fi 6E access point, using SSID and BSSID over the rogue access point operating channel. The beacons are spoofed by modifying the MFP field value to indicate no encryption capability and also to indicate no encryption requirement for management frames.

The transmission module 240 transmits beacons (i.e., standard and spoofed beacons) and data packets over the wireless channel. One hardware embodiment includes Wi-Fi transceivers that signal across a wireless channel. The data packets are formatted according to IEEE 802.11 and other standards.

II. Methods for Preventing Rogue Connections Before Establishing Encrypted Connection (FIGS. 4-6)

Figure 4:
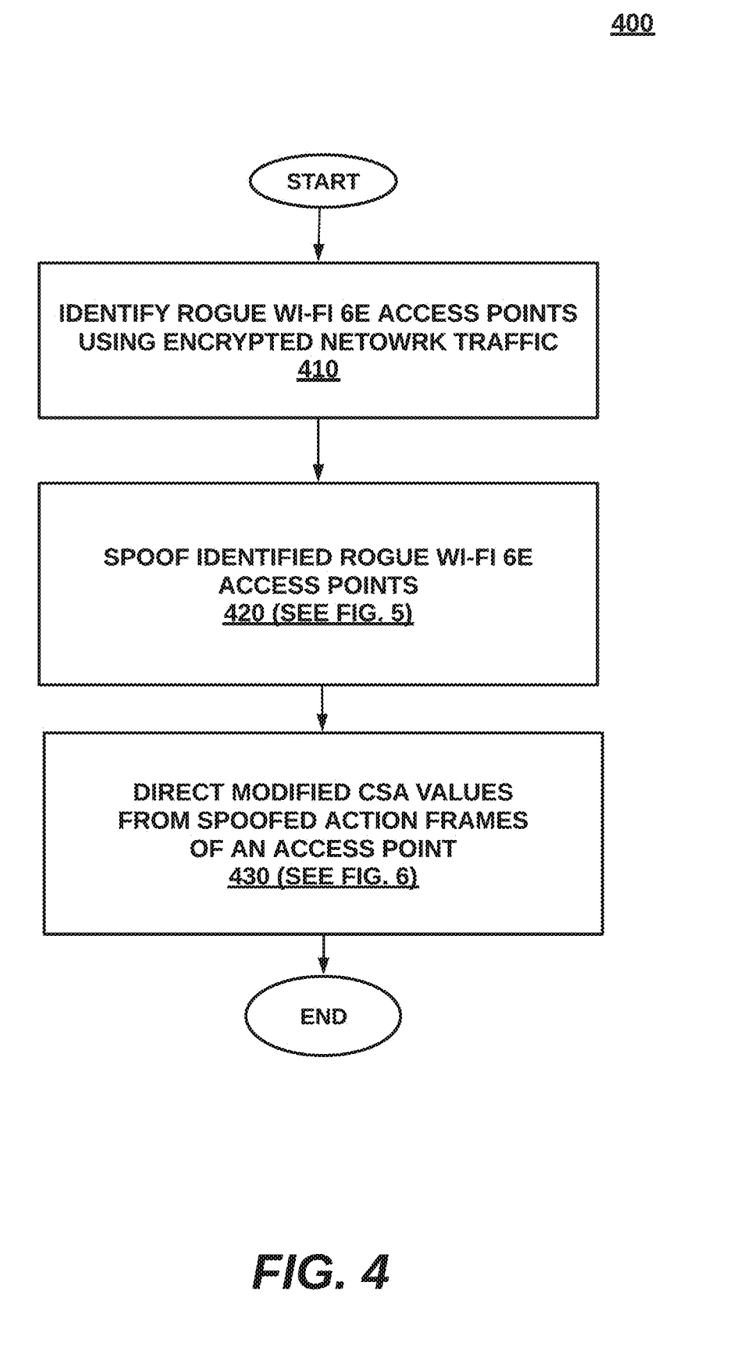
FIG. 4 is a high-level flow chart for detecting encryption and preventing connections from Wi-Fi 6E stations to rogue Wi-Fi 6E access points, prior to encrypted connection, according to an embodiment.

FIG. 4 is a high-level flow diagram illustrating a method 400 for preventing connections from Wi-Fi 6E stations to rogue Wi-Fi 6E access points. The method 400 can be implemented by, for example, system 100 of FIG. 1. At step 410, Wi-Fi 6E access points are configured for identifying rogue Wi-Fi 6E access points using encrypted network traffic. At step 420, identified rogue Wi-Fi 6E access points are spoofed prior to encryption. In some implementations, additional spoofing techniques are used for encrypted traffic after connection to a rogue Wi-Fi 6E. For example, CSA fields can be manipulated to break the connection. In turn, the connection can remain broken using spoofing during the unencrypted connection phase.

Figure 5:
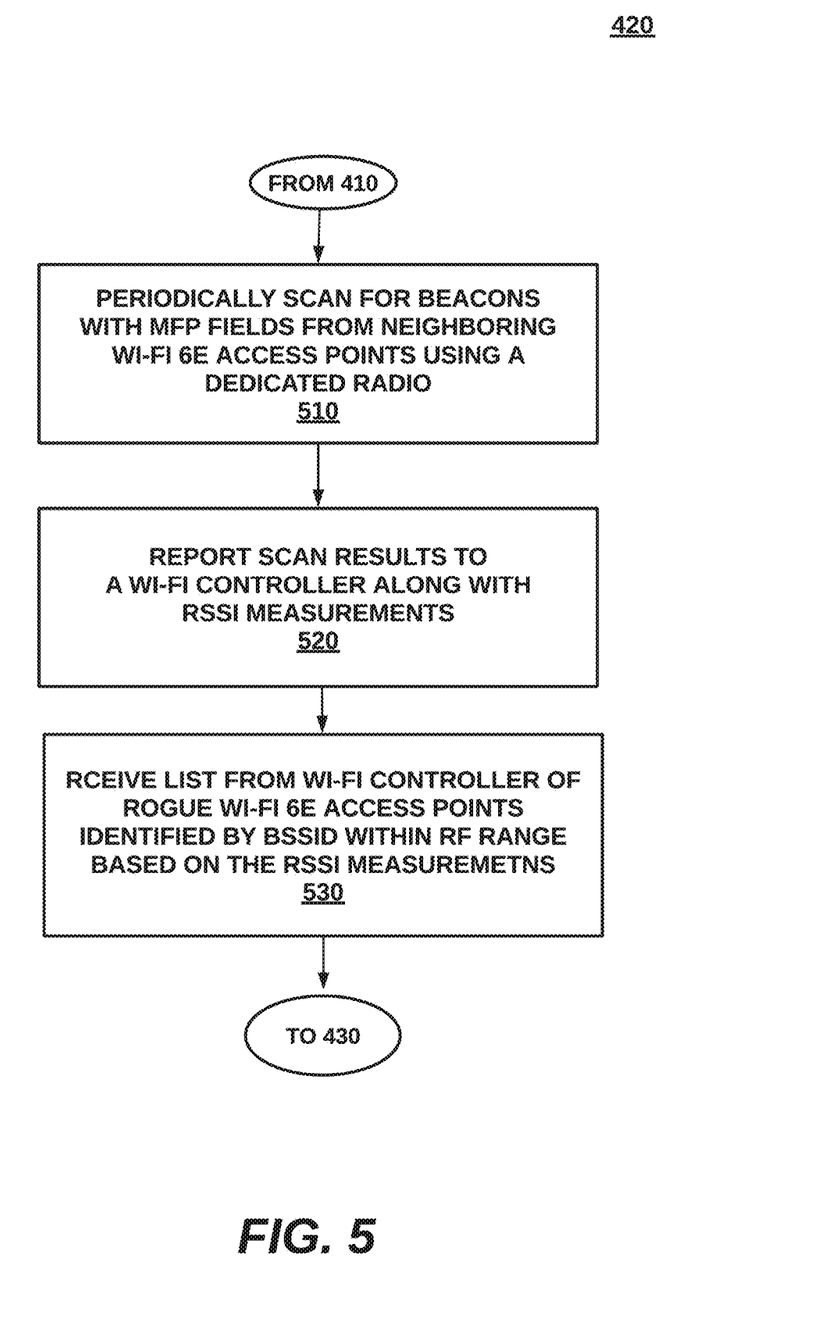
FIG. 5 is a more detailed flow chart for a step of identifying rogue Wi-Fi 6E access points, from the method of FIG. 4, according to one embodiment.

A more detailed example of step 410 for identifying rogue Wi-Fi 6E access points with scanning, is shown in FIG. 5, according to one embodiment. At step 510, antennae are periodically scanning for beacons from neighboring Wi-Fi 6E access points using a dedicated radio of a plurality of radios. The detected neighboring Wi-Fi 6E access points beacons include management frame protection (MFP) fields indicating encryption capability and also indicating encryption requirement for management frames. At step 520, scan results are reported to a Wi-Fi controller including BSSID, SSID, and an operating channel along with RSSI measurements, to determine whether Wi-Fi 6E access points is rogue. A rogue Wi-Fi 6E access points is a third-party vendor having an OUI mismatch with an OUI of the vendor of Wi-Fi 6E access point from the BSSID. At step 530, a list is received from the Wi-Fi controller of rogue Wi-Fi 6E access points identified by BSSID within a vicinity of the Wi-Fi 6E access points based on RSSI measurements sent to the Wi-Fi controller.

Figure 6:
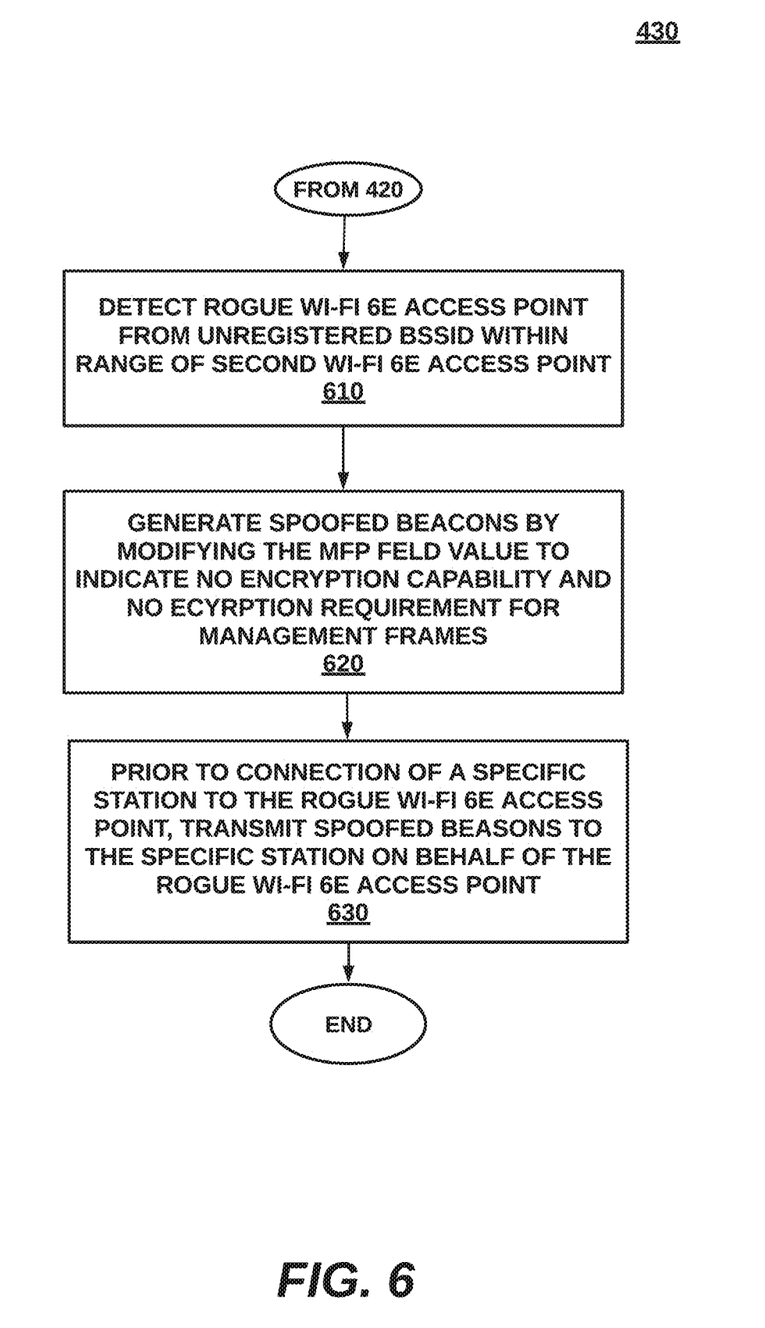
FIG. 6 is a more detailed flow chart for a step of spoofing identified rogue Wi-Fi 6E access points, from the method of FIG. 4, according to one embodiment.

Next, a more detailed example of step 420 spoofing Wi-Fi 6E access points prior to establishing an encrypted connection is shown in FIG. 6. At step 610, a rogue Wi-Fi 6E access point of the Wi-Fi controller list is detected from the periodic beacon scanning. At step 620 spoofed beacons are generated by modifying the MFP field value to indicate no encryption capability and also to indicate no encryption requirement for management frames. At step 630, prior to connection of a specific station to the rogue Wi-Fi 6E access point, spoofed beacons are broadcasted to specific station and other devices on behalf of the rogue Wi-Fi 6E access point, using SSID and BSSID over the operating channel.

III. Computing Device for Preventing Rogue Connections Before Establishing Encrypted Connection (FIG. 7)

Figure 7:
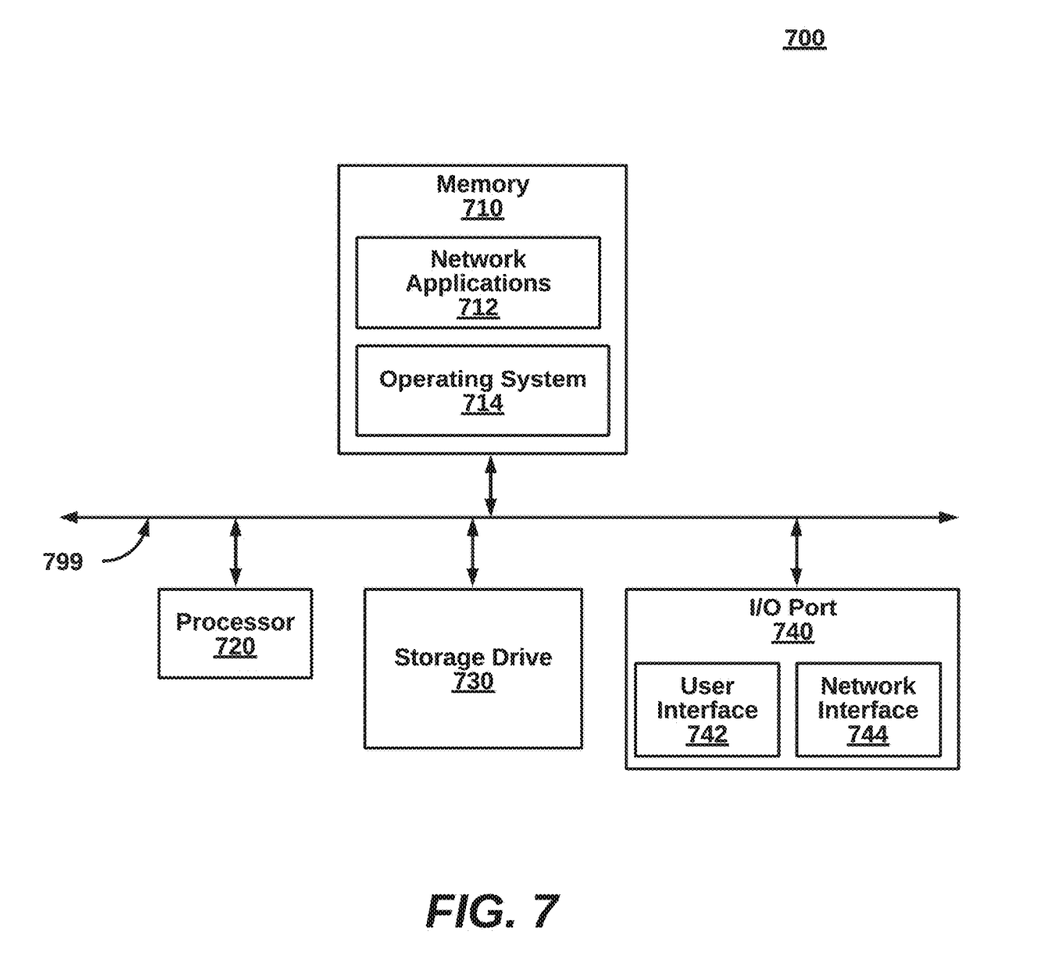
FIG. 7 is a block diagram illustrating an example computing device implementing the network system of FIG. 1, according to one embodiment.

FIG. 7 is a block diagram illustrating a computing device 700 implementing the packet processor 100 of FIG. 1, according to one embodiment. The computing device 700 is a non-limiting example device for implementing each of the components of the system 100, including the Wi-Fi 6E access point 110, access points 120A, B and Wi-Fi 6E station 130. Additionally, the computing device 700 is merely an example implementation itself, since the system 100 can also be fully or partially implemented with laptop computers, tablet computers, smart cell phones, Internet access applications, and the like.

The computing device 700, of the present embodiment, includes a memory 710, a processor 720, a hard drive 730, and an I/O port 740. Each of the components is coupled for electronic communication via a bus 750. Communication can be digital and/or analog, and use any suitable protocol.

The memory 710 further comprises network access applications 712 and an operating system 714. Network access applications can include 712 a web browser, a mobile access application, an access application that uses networking, a remote access application executing locally, a network protocol access application, a network management access application, a network routing access applications, or the like.

The operating system 714 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 720 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the hard drive 730.

The storage device 730 can be any non-volatile type of storage such as a magnetic disc, EEPROM, Flash, or the like. The storage device 730 stores code and data for access applications.

The I/O port 740 further comprises a user interface 742 and a network interface 744. The user interface 742 can output to a display device and receive input from, for example, a keyboard. The network interface 744 connects to a medium such as Ethernet or Wi-Fi for data input and output. In one embodiment, the network interface 744 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A method in a Wi-Fi 6E compatible access point on a data communication network, for preventing connections from Wi-Fi 6E stations to rogue Wi-Fi 6E access points, prior to establishing an encrypted connection, the method comprising the steps:

periodically scanning for beacons from neighboring Wi-Fi 6E access points using a dedicated radio of a plurality of radios, and detecting the neighboring Wi-Fi 6E access points beacons include management frame protection (MFP) fields indicating encryption capability and also indicating encryption requirement for management frames;

reporting scan results to a Wi-Fi controller including BSSID, SSID, and an operating channel along with RSSI measurements, to determine whether Wi-Fi 6E access points is rogue, wherein a rogue Wi-Fi 6E access points is a third-party vendor having an OUI mismatch with an QUI of the third-party vendor of Wi-Fi 6E access point from the BSSID;

receiving a list from the Wi-Fi controller of rogue Wi-Fi 6E access points identified by BSSID (Basic Service Set Identifier), SSID (Service Set Identifier), and an operating channel along with RSSI (Radio Signal Strength Indicator) measurements sent to the Wi-Fi controller; and detecting a rogue Wi-Fi 6E access point of the Wi-Fi controller list from the periodic beacon scanning; and prior to connection of a specific station to the rogue Wi-Fi 6E access point, broadcasting spoofed beacons on behalf of the rogue Wi-Fi 6E access point, using SSID and BSSID over the operating channel, wherein the beacons are spoofed by modifying the MFP field value to indicate no encryption capability and also to indicate no encryption requirement for management frames.

2. The method of claim 1, further comprising:
tracking a connection status of the specific station.

3. The method of claim 1, detecting a connection response to one of the spoofed beacons from the specific Wi-Fi 6E station.

4. The method of claim 1, wherein the Wi-Fi controller is cloud-based and the neighboring Wi-Fi 6E access points are on a local access network.

5. The method of claim 1, wherein the rogue Wi-Fi 6E access point is identified by more than one of the neighboring Wi-Fi 6E access points, and is subject to spoofed beacons from the more than one of the neighboring access points.

6. A non-transitory computer-readable medium storing computer-readable instructions in a Wi-Fi 6E access point on a data communication network, that when executed by a processor, perform a method for preventing connections from Wi-Fi 6E stations to rogue Wi-Fi 6E access points, prior to establishing an encrypted connection, the method comprising:

periodically scanning for beacons from neighboring Wi-Fi 6E access points using a dedicated radio of a plurality of radios, and detecting the neighboring Wi-Fi 6E access points beacons include management frame protection (MFP) fields indicating encryption capability and also indicating encryption requirement for management frames;

reporting scan results to a Wi-Fi controller including BSSID (Basic Service Set Identifier), SSID (Service Set Identifier), and an operating channel along with RSSI (Radio Signal Strength Indicator) measurements, to determine whether Wi-Fi 6E access points is rogue, wherein a rogue Wi-Fi 6E access points is a third-party vendor having an OUI mismatch with an QUI of the third-party vendor of Wi-Fi 6E access point from the BSSID;

receiving a list from the Wi-Fi controller of rogue Wi-Fi 6E access points identified by BSSID within a vicinity of the Wi-Fi 6E access points based on RSSI measurements sent to the Wi-Fi controller; and detecting a rogue Wi-Fi 6E access point of the Wi-Fi controller list from the periodic beacon scanning; and prior to connection of a specific station to the rogue Wi-Fi 6E access point, broadcasting spoofed beacons on behalf of the rogue Wi-Fi 6E access point, using SSID and BSSID over the operating channel of the rogue Wi-Fi 6E access point, wherein the beacons are spoofed by modifying the MFP field value to indicate no encryption capability and also to indicate no encryption requirement for management frames.

7. The method of claim 6, further comprising:
tracking a connection status of the specific station.

8. The method of claim 6, detecting a connection response to one of the spoofed beacons from the specific Wi-Fi 6E station.

9. The method of claim 6, wherein the Wi-Fi controller is cloud-based and the neighboring Wi-Fi 6E access points are on a local access network.

10. The method of claim 6, wherein the rogue Wi-Fi 6E access point is identified by more than one of the neighboring Wi-Fi 6E access points, and is subject to spoofed beacons from the more than one of the neighboring access points.

11. A Wi-Fi 6E access point on a data communication network, for preventing connections from Wi-Fi 6E stations to rogue Wi-Fi 6E access points, prior to establishing an encrypted connection, the Wi-Fi 6E access point comprising:

a processor;

a network communication module, communicatively coupled to the processor and to the data communication network; and a memory, communicatively coupled to the processor and storing:

a rogue Wi-Fi 6E scanning module to periodically scan for beacons from neighboring Wi-Fi 6E access points using a dedicated radio of a plurality of radios, and detect the neighboring Wi-Fi 6E access points beacons include management frame protection (MFP) fields indicating encryption capability and also indicating encryption requirement for management frames;

a rogue Wi-Fi 6E identification module reports scan results to a Wi-Fi controller including BSSID (Basic Service Set Identifier), SSID (Service Set Identifier), and an operating channel along with RSSI (Radio Signal Strength Indicator) measurements, to determine whether Wi-Fi 6E access points is rogue, wherein a rogue Wi-Fi 6E access points is a third-party vendor having an OUI mismatch with an QUI of the third-party vendor of Wi-Fi 6E access point from the BSSID, wherein the rogue Wi-Fi 6E identification module receives a list from the Wi-Fi controller of rogue Wi-Fi 6E access points identified by BSSID within a vicinity of the Wi-Fi 6E access points based on RSSI measurements sent to the Wi-Fi controller and wherein the rogue Wi-Fi6E identification module detects a rogue Wi-Fi 6E access point of the Wi-Fi controller list from the periodic beacon scanning; and a rogue Wi-Fi 6E spoofing module, prior to connection of a specific station to the rogue Wi-Fi 6E access point, broadcasts spoofed beacons on behalf of the rogue Wi-Fi 6E access point, using SSID and BSSID over the operating channel, wherein the beacons are spoofed by modifying the MFP field value to indicate no encryption capability and also to indicate no encryption requirement for management frames.

12. The Wi-Fi 6E access point of claim 11, wherein a connection status of the specific station is tracked.

13. The Wi-Fi 6E access point of claim 11, wherein a connection response to one of the spoofed beacons from the specific Wi-Fi 6E station is detected.

14. The Wi-Fi 6E access point of claim 11, wherein the Wi-Fi controller is cloud-based and the neighboring Wi-Fi 6E access points are on a local access network.

15. The Wi-Fi 6E access point of claim 11, wherein the rogue Wi-Fi 6E access point is identified by more than one of the neighboring Wi-Fi 6E access points, and is subject to spoofed beacons from the more than one of the neighboring access points.

* * * * *